United States Patent [19]
Timmons

[11] 3,783,175
[45] Jan. 1, 1974

[54] ELECTRICAL CORD GUIDE ASSEMBLY
[75] Inventor: Jay Timmons, Palos Verdes Estates, Calif.
[73] Assignee: Hiebert, Inc., Torrance, Calif.
[22] Filed: Apr. 28, 1972
[21] Appl. No.: 248,640

[52] U.S. Cl.................. 174/48, 174/65 R, 312/223
[51] Int. Cl............................................. A47b 19/04
[58] Field of Search.................. 174/65 R, 65 G, 48, 174/49, 82, 81, 66; 220/24.3, 3.8; 312/223, 140.3, 140.4, 292, 194; 108/23, 50; 138/89, 96 R, 96 T

[56] References Cited
UNITED STATES PATENTS

| | | | |
|---|---|---|---|
| 1,653,403 | 12/1927 | McCue............................. | 138/96 R |
| 3,542,940 | 11/1970 | Flachbarth et al................ | 138/89 X |
| 3,499,097 | 3/1970 | Widstrand......................... | 174/65 G |
| 3,635,174 | 1/1972 | Ball.................................. | 312/223 X |
| 1,689,414 | 10/1928 | Trammell.......................... | 312/293 |
| 945,753 | 1/1910 | Chamberlain et al. ............ | 220/24.3 |
| 3,193,613 | 6/1965 | Van Buren........................ | 174/65 G |

Primary Examiner—Bernard A. Gilheany
Assistant Examiner—D. A. Tone
Attorney—Robert H. Fraser et al.

[57] ABSTRACT

An assembly is disclosed for guiding an electrical cord such as a multiwire telephone cord through a generally planar element such as the top of a desk or other piece of office furniture. The assembly includes a generally cylindrical sleeve adapted to be disposed within a circular aperture in the desk top so as to define a seating member and having a hollow interior of sufficient size to accommodate any portion of the electrical cord such as a relatively large plug at the leading end thereof as the cord is passed therethrough. The assembly also includes a generally disk-shaped cap which functions as a securing member by securing the electrical cord within a recess in the edge thereof and against the inside of the sleeve as the cap is mounted over one end of the sleeve and secured in place via a spring which is mounted on one side of the cap and which engages opposite sides of the sleeve interior when expanded.

10 Claims, 5 Drawing Figures

PATENTED JAN 1 1974
3,783,175
SHEET 1 OF 2
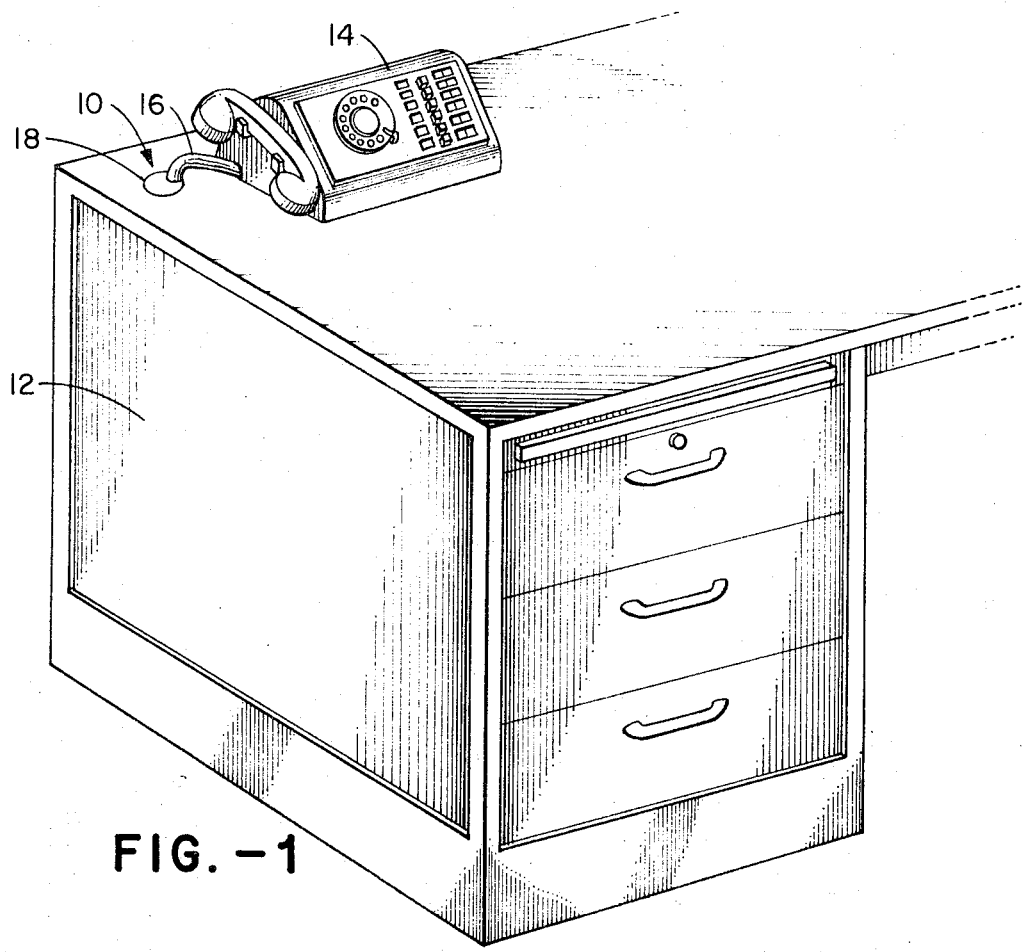
FIG.—1
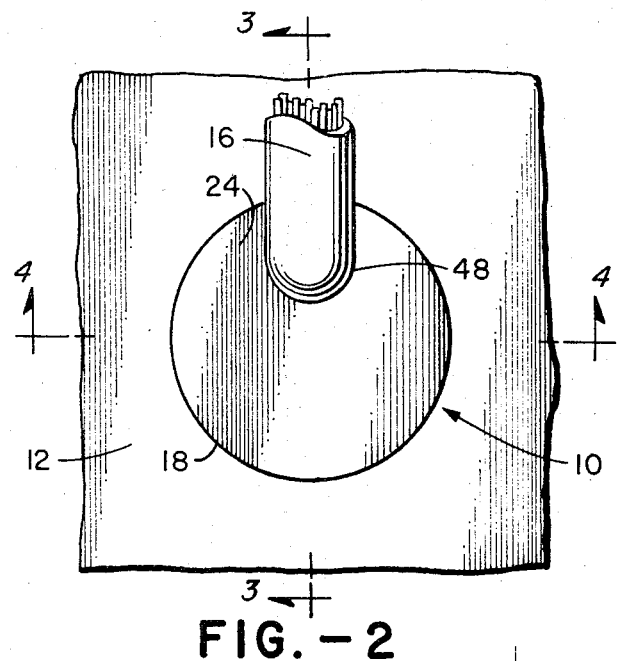
FIG.—2

ELECTRICAL CORD GUIDE ASSEMBLY

BACKGROUND OF THE INVENTION

1. Field of the Invention

The present invention relates broadly to devices for mounting or securing electrical cords to fixed objects which they pass through, and more particularly to an assembly for passing an electrical cord through and securing the cord to a generally planar part of a piece of office furniture such as a desk top.

2. History of the Prior Art

It is known to provide a device for passing an electrical cord such as a telephone cord through one or more panel-like elements which may form a part of a desk or other piece of furniture or even a custom installation. The passage of the electrical cord through panel-shaped elements may be necessary for certain installations or at least desirable for still others. One such device which comprises a simple plug is shown in U. S. Pat. No. 1,689,414 of Trammell. The plug-like device shown in that patent comprises a single element of cylindrical configuration adapted to be fitted over a telephone cord and then forced into place within a circular aperture in the top of a telephone cabinet so as to secure the cord relative to the top as the cord passes from a call box up through the top and to the telephone receiver. Another type of device which is shown in U. S. Pat. No. 1,905,402 of Sink comprises a relatively long tube which is adapted to be mounted on the inside of the side of a desk and which is curved at one end thereof so as to terminate in a flanged portion adapted to be secured to the outside surface of the desk side. The elongated tube when so installed in the desk provides a means for passing the cord from a telephone receiver at the top of the desk to a bell box mounted underneath the desk.

Devices of the type shown in the Trammell and Sink patents are typical of the prior art devices which may be used to pass an electrical cord through an aperture in an element. The plug-like element shown in Trammell, while of simple design and low expense, lacks the versatility necessary for many electrical cord installations and lends an external appearance which would be generally unacceptable in certain present day installations such as in relatively expensive desks and similar pieces of office furniture. Plug-like devices of this type are dimensioned such that they can accept only the electrical cord itself and nothing larger such as the plug which is commonly affixed to the end of the telephone cord where the well-known call director is to be installed. Such devices must be wedged or forced into place in such fashion as to become mounted while simultaneously securing the electrical cord, and therefore do not provide a type of mounting which is sturdy and yet easy to install. The particular device shown in the Sink patent is designed for a very special installation and accordingly is greatly limited in its adaptability to a variety of different electrical cord installations. Moreover the particular device shown suffers from the same general disadvantages present in devices of the type shown in Trammell in that there is no provision for an easy and yet sturdy mount, nor can such a device pass a plug or other large portion of the electrical cord therethrough during installation.

Accordingly it is an object of the invention to provide an improved device or assembly for passing an electrical cord through an aperture in an element and securing the cord.

It is a more specific object of the invention to provide a device or assembly which is capable of passing an enlarged object such as an electrical plug at the tip of an electrical cord therethrough and thereafter securing the smaller cord itself within the opening of an element.

It is still a further object of the invention to provide a device or assembly in which an electrical cord is easily passed through and mounted within an aperture in an element while at the same time being relatively sturdily secured therein.

It is a still further object of the invention to provide improved methods for passing an electrical cord through an aperture in an element and securing the cord within the aperture.

BRIEF DESCRIPTION OF THE INVENTION

Electrical cord guiding assemblies in accordance with the invention include a first or seating member adapted to be mounted within an aperture in the particular element through which the electrical cord is to pass so as to define a seat for the assembly as well as a first opening therein of sufficient size to pass an enlarged portion of the electrical cord such as a plug at the leading end of the cord therethrough. A second or securing member of such assemblies is thereafter readily secured to the seating member so as to fill in the first opening and encompass the electrical cord within a second opening of smaller size. The assembly is thus able to accommodate enlarged portions of the electrical cord during installation. At the same time installation itself is made relatively simple by simply locating the seating member within the aperture during the initial part of the installation and thereafter readily installing the securing member therein so as to secure the electrical cord within a completed assembly which is very sturdy and rigid.

In one preferred embodiment of an assembly according to the invention the seating member comprises a generally cylindrical sleeve adapted to be positioned within the aperture through which the electrical cord is to pass. The sleeve has a hollow interior which defines the first opening and which is large enough to accommodate a plug or other enlarged portion of the electrical cord. The securing member comprises a generally disk-shaped cap adapted to be mounted to one end of the sleeve by appropriate means such as a spring mounted on one side of the cap and engageable with opposite sides of the hollow interior of the sleeve so as to secure the electrical cord within the smaller second opening as defined by a recess in one edge of the cap and adjacent portions of the sleeve.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 1 is a perspective view of a portion of a desk together with a call director illustrating one typical installation of an electrical cord guide assembly in accordance with the invention;

FIG. 2 is a top view of the guide assembly of FIG. 1;

DETAILED DESCRIPTION

Figure 3:
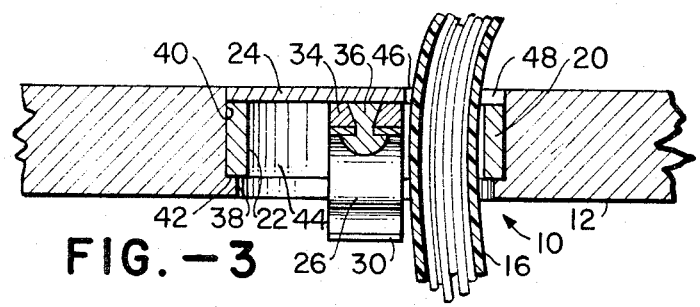
FIG. 3 is a sectional view of the guide assembly of FIG. 2 taken along the line 3—3 thereof.

A preferred form of an electrical cord guide assembly 10 in accordance with the invention is illustrated in FIG. 1 in conjunction with a desk 12 and a telephone call director 14. The electrical cord guide assembly 10 secures an electrical cord 16 as the cord 16 passes through an aperture 18 in the top of the desk 12 to the inside of the desk 12.

The end of the electrical cord 16 opposite the call director 14 emanates from an electrical box or other installation on the floor located under the desk 12. Thus if the desk 12 is of the type in which the sides and front thereof extend all the way to the floor, it is necessary to provide some means for passing the cord 16 through and securing the cord 16 within an aperture at or near the top of the desk 12. This function is performed by the guide assembly 10. It may also be desirable to pass the cord 16 up through the inside of the desk and secure it in place using the assembly 10 even where other types of desks are used or where the cord 16 emanates from a location on the floor outside of rather than underneath the desk for various reasons including a desire to improve the overall appearance of the desk 12 by eliminating the generally unsightly cords which typically run along the top of and down along the sides or back of desks, credenzas or similar pieces of office furniture.

The desk 12 and the call director 14 of FIG. 1 merely represent one example of an installation in which the assembly 10 can be advantageously utilized. It will be appreciated by those skilled in the art from the discussion to follow that the assembly 10 in accordance with the invention can be used with items of furniture other than office furniture, for electrical cords other than telephone cords and for installations involving other than furniture or parts thereof.

The assembly 10 of FIG. 1 is shown in greater detail in FIGS. 2-5. As seen in these figures the assembly 10 includes a generally cylindrically shaped sleeve 20 having a hollow interior 22 thereof. The assembly 10 also includes a disk-shaped cap 24 having a dimension similar to that of the sleeve 20. More specifically the diameter of the cap 24 is substantially equal to the outer diameter of the sleeve 20. In this manner the cap 24 can be seated over one end of the sleeve 20 so as to enclose the interior 22 of the sleeve 20 when held in place by a spring 26.

Figure 4:
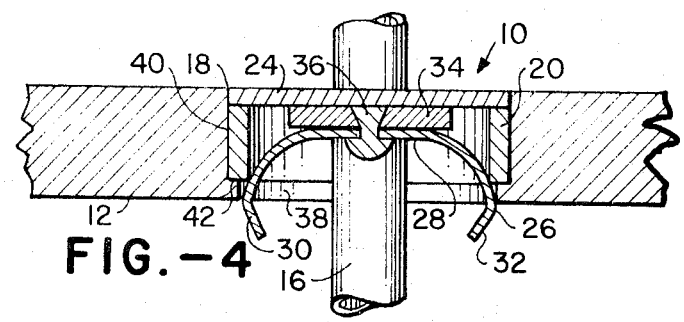
FIG. 4 is a sectional view of the guide assembly of FIG. 2 taken along the line 4—4 thereof.
Figure 5:
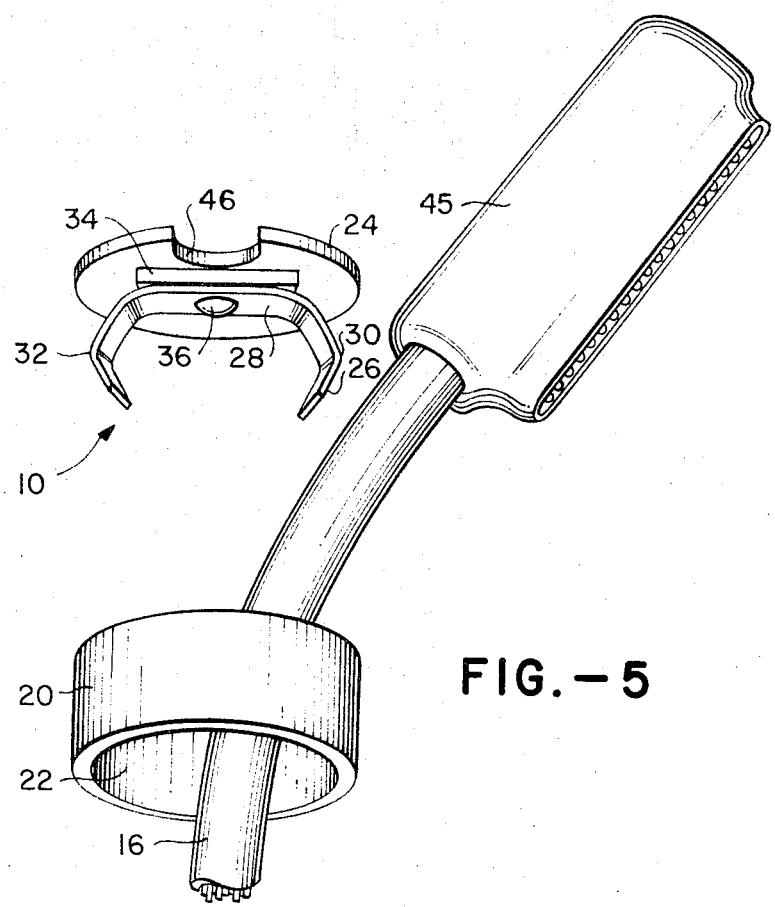
FIG. 5 is a perspective view of the guide assembly of FIG. 2 with the parts thereof separated from one another and the electrical cord and an included plug extending through the seating member.

The spring 26 provides a means for fastening the cap 24 to the sleeve 20. As shown in FIGS. 4 and 5 the spring 26 includes a relatively flat central portion 28 thereof disposed between opposite curved end portions 30 and 32 thereof. The flat central portion 28 of the spring 26 is mounted on one side of the cap 24 and the curved end portions 30 and 32 extend away from the cap 24. The spring 26 is preferably made of spring steel and therefore cannot be spot welded to the cap 24 which is preferably made of steel. Accordingly the spring 26 is fastened to an elongated, relatively flat plate 34 by a rivet 36 extending through and joining the plate 34 to the flat central portion 28 of the spring 26.

Thereafter the plate 34 which is preferably made of steel is spot welded to a central portion of the one side of the cap 24 using conventional techniques.

When the opposite curved end portions 30 and 32 of the spring 26 are compressed toward one another, the distance therebetween becomes at least as small as the inner diameter of the sleeve 20 so that the spring 26 may be inserted into the hollow interior 22 of the sleeve 20 until the cap 24 is positioned against the end of the sleeve 20. At this point the spring 26 expands so that the opposite curved end portions 30 and 32 engage the opposite sides of the hollow interior 22 of the sleeve 20. The curved end portions 30 and 32 actually extend outside of the hollow interior 22 so as to engage one edge of the side of the sleeve 20 opposite the cap 24 with the distance between the curved end portions 30 and 32 being greater than the inner diameter of the sleeve 20.

Installation of the assembly 10 is preceded by formation of the aperture 18. As seen in FIGS. 3 and 4 formation of the aperture 18 is a two-step process. The first such step comprises formation of a first circular aperture 38 of diameter less than the outer diameter but greater than the inner diameter of the sleeve 20. The first circular aperture 38 extends through the entire thickness of the desk 12. Thereafter a second circular aperture is formed within the desk 12 so as to be generally concentric with the first circular aperture 38 and so as to extend through a portion but not all of the thickness of the desk 12. More particularly the depth of the second circular aperture 40 is dictated by the thickness of the sleeve 20 and the cap 24.

With the aperture 18 thus formed the next step is to insert the sleeve 20 into the aperture 18 until the sleeve 20 rests against an annular shoulder 42 formed by the junction between the first and second circular apertures 38 and 40. As so positioned the sleeve 20 forms a seating member for receiving the cap 24 together with the electrical cord 16.

With the sleeve 20 positioned within the aperture 18 the hollow interior 22 thereof defines a first aperture 44 the size of which is selected to permit passage of the largest portion of the electrical cord 16 between opposite sides of the desk 12. In the case of the call director 14 an electrical plug 45 (shown in FIG. 5) several times wider than the diameter of the electrical cord 16 is attached to the leading end of the cord 16. The first aperture 44 is sufficiently large to permit passage of the plug 45 therethrough. Thereafter the plug 45 is coupled to the call director 14 and the approximate length of the cord 16 which is required to be above the top of the desk 12 is determined such that a selected portion of the length of the cord 16 is positioned within the sleeve 20 and thereby relative to the top of the desk 12.

Thereafter it is a relatively simple matter of coupling the cap 24 to the sleeve 40 to secure the electrical cord 16. This is accomplished by positioning a recess 46 within the edge of the cap 24 around the electrical cord 16 while at the same time forcing the cap 24 downwardly onto the sleeve 20 such that the spring 24 is compressed and the curved end portions 30 and 32 thereof caused to slide along the opposite sides of the hollow interior 22 of the sleeve 20. The downward motion of the cap 24 onto the sleeve 20 continues until the cap 24 is seated upon the sleeve 20. As previously noted the spring at this point is able to expand such that the opposite curved end portions 30 and 32 rest against the lower edge of the sleeve 20 and extend outside of the sleeve 20.

With the cap 24 coupled to the sleeve 20, the recess 46 within the cap 24 combines with the sleeve 20 to form a second aperture 48 of considerably smaller size than the first aperture 44. Ideally the second aperture 48 is sufficiently small so as to closely surround and thereby secure the electrical cord 16 to the assembly 10. At the same time, however, a small amount of space should exist between the aperture 48 and the cord 16 to permit some movement of the cord 16 through the aperture 48. This may be necessary, for example, if the call director 14 is moved to a different location on top of the desk 12. Where it becomes necessary or desirable to rotate the recess 46 in the cap 24 relative to the top of the desk 12 and the included sleeve 20 the pressure of the spring 26 against the inside of the sleeve 20 may be small enough to permit simple rotation by hand of the cap 24. Where the force of the spring 26 is too great to permit simple hand rotation, the rivet 36 will typically permit some rotation of the cap 24 relative to the spring 26 with the spring 26 remaining fixed against the sleeve 20.

It will be appreciated by those skilled in the art that electrical cord guide assemblies in accordance with the invention provide a number of improvements over the devices of the prior art. Assemblies in accordance with the invention are very rigid and sturdy, yet are easy to mount and assemble. Moreover the construction of such assemblies is such that large objects such as a call director plug can be accommodated as well as smaller objects such as the electrical cord itself. With the top of the cap 24 appropriately finished and the assembly 10 installed in place, the result is a very neat and pleasing appearance.

As previously noted the various parts of the assembly 10 are preferably made of metal such as steel, primarily to render the assembly 10 very sturdy and rigid. Also a metal cap 24 is easily plated or otherwise processed so as to provide a pleasing finished appearance where desired. Where sturdiness is of lesser importance part of all of the assembly 10 can be made of other appropriate materials such as plastics at some savings in the expense of the assembly 10.

While the invention has been particularly shown and described with reference to a preferred embodiment thereof, it will be understood by those skilled in the art that various changes in form and details may be made therein without departing from the spirit and scope of the invention.

What is claimed is:

1. An assembly comprising a member having a generally flat surface and a generally circular aperture extending therethrough from the surface, a hollow, generally cylindrical sleeve seated within the generally circular aperture within the member and a generally disk-shaped cap having a diameter similar to that of the sleeve, an aperture therein at least large enough to accommodate an electrical cord and means for mounting the cap over one end of the sleeve so that the cap is generally continuous with the surface of the member.

2. The invention defined in claim 1, wherein the means for mounting the cap over one end of the sleeve comprises a spring fixedly mounted on one side of the cap so as to engage opposite sides of the hollow interior of the sleeve when the cap is mounted over the one end of the sleeve.

3. The invention defined in claim 2, wherein the spring has a relatively flat central portion thereof mounted to the one side of the cap at a central region of the cap and a pair of end portions thereof on opposite sides of the flat central portion which curve outwardly in directions away from the cap and which are capable of being compressed toward one another to clear and then engage the opposite sides of the hollow interior of the sleeve as the cap is mounted over the one end of the sleeve.

4. An assembly for guiding an electrical cord through a member, the assembly comprising a hollow, generally cylindrical sleeve adapted to be seated within a generally circular aperture of similar dimension within a member and a generally disk-shaped cap having a diameter similar to that of the sleeve, an aperture therein at least large enough to accommodate an electrical cord and means for mounting the cap over one end of the sleeve, the means for mounting comprising a spring mounted on one side of the cap so as to engage opposite sides of the hollow interior of the sleeve when the cap is mounted over the one end of the sleeve and a metal plate which is riveted to the spring and which is spot welded to the one side of the cap.

5. An arrangement for passing an electrical cord through an aperture in an element between opposite sides of the element comprising an element having an aperture extending therethrough between opposite sides thereof, first means positioned completely within the aperture so as to define a relatively rigid seating member and second means engaged with the seating member so as to be generally continuous with one of the surfaces of the element and so as to define a member which is capable of securing an electrical cord relative to the seating member.

6. The invention defined in claim 5, wherein the seating member comprises a generally cylindrical member positioned within the aperture in the element and having a hollow interior through which an electrical cord may be passed and the securing member comprises a member secured to the cylindrical member and thereby enclosing the hollow interior of the cylindrical member, the securing member including means for securing an electrical cord thereto.

7. The invention defined in claim 6, wherein the securing member comprises a generally disk-shaped member enclosing one end of the cylindrical member and having a recess in the edge thereof.

8. A method of extending an electrical cord having an enlarged plug at the leading end thereof through an element and positioning the cord relative to the element comprising the steps of forming an aperture in the element, positioning a seating member having a first opening therein completely within the aperture, drawing the cord and plug through the first opening in the seating member until a desired position of the cord relative to the element is attained, positioning the cord within a recess in a securing member, the recess being larger than the cord and smaller than the plug, and moving the securing member along the cord and into engagement with the seating member so that the securing member is disposed at one end of the aperture in the element, covers the first opening in the seating member and positions the electrical cord within a second opening defined by the recess.

9. A method of extending an electrical cord through an element and positioning the cord relative to the element comprising the steps of providing a first aperture which extends through the entire thickness of the element, providing a second aperture which extends through part of the thickness of the element and which is common with a part of the first aperture, positioning a seating member which is larger than the first aperture and approximately the size of the second aperture within the second aperture, drawing the cord through the first opening in the seating member until a desired position of the cord relative to the element is attained, and mounting a securing member having a second opening therein so as to cover the first opening in the seating member and position the electrical cord within the second opening.

10. An arrangement comprising a seating member having a hollow interior and a securing member having a spring fixedly mounted thereto, the spring engaging the seating member and mounting the securing member on the seating member so as to cover the hollow interior thereof, the securing member having a recess extending inwardly from an edge thereof and large enough to accommodate an electrical cord therein.

* * * * *